US006493332B1

(12) United States Patent
Hirade

(10) Patent No.: US 6,493,332 B1
(45) Date of Patent: Dec. 10, 2002

(54) IS-95 BASE STATION APPARATUS, W-CDMA BASE STATION APPARATUS, MOBILE COMMUNICATION SYSTEM, AND FREQUENCY SHARING METHOD

(75) Inventor: Sei Hirade, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/272,614

(22) Filed: Mar. 19, 1999

(30) Foreign Application Priority Data

Mar. 30, 1998 (JP) .......................................... 10-084107

(51) Int. Cl.[7] .............................................. H04B 7/216
(52) U.S. Cl. ...................................................... 370/342
(58) Field of Search ................................ 370/342, 343, 370/345, 346, 347, 335, 336, 441, 442, 443, 333, 350, 513, 514; 455/436, 437, 438, 439, 446, 450, 454

(56) References Cited

U.S. PATENT DOCUMENTS

| 5,697,055 | A | | 12/1997 | Gilhousen et al. |
| 6,064,890 | A | * | 5/2000 | Hirose .......................... 455/513 |
| 6,246,673 | B1 | * | 6/2001 | Tiedemann .................. 370/333 |
| 6,253,086 | B1 | * | 6/2001 | Parantainen ................. 455/446 |
| 6,275,701 | B1 | * | 8/2001 | Cerwall ....................... 455/436 |
| 6,317,412 | B1 | * | 11/2001 | Natali ......................... 370/208 |

FOREIGN PATENT DOCUMENTS

| JP | 8-149551 | 6/1996 |
| JP | 9-8769 | 1/1997 |
| JP | 9-247079 | 9/1997 |
| JP | 9-247085 | 9/1997 |
| JP | 9-326743 | 12/1997 |
| JP | 9-512693 | 12/1997 |
| JP | 10-23502 | 1/1998 |
| WO | WO 93/16534 | 8/1993 |

* cited by examiner

Primary Examiner—Douglas Olms
Assistant Examiner—Ricardo M. Pizarro
(74) Attorney, Agent, or Firm—Young & Thompson

(57) ABSTRACT

In a frequency sharing method, IS-95 base station apparatuses and W-CDMA base station apparatuses are arranged in a one-to-one correspondence. The first base station transmission power value of the first base station apparatus is obtained in each frequency band in the IS-95 scheme. The second base station transmission power value of the second base station apparatus adjacent to the first base station apparatus is obtained. Whether there is a frequency band in the IS-95 scheme in which the sum of the first and second base station transmission power values is a predetermined threshold or more is determined. When there is a frequency band in the IS-95 scheme in which the sum is the predetermined threshold or more, a frequency handoff is performed to switch a communication channel in the IS-95 scheme which is using the frequency band in which the sum is not less than the predetermined threshold to another frequency band in the IS-95 scheme. An IS-95 base station apparatus, a mobile communication system, and a W-CDMA base station apparatus are also disclosed.

10 Claims, 12 Drawing Sheets

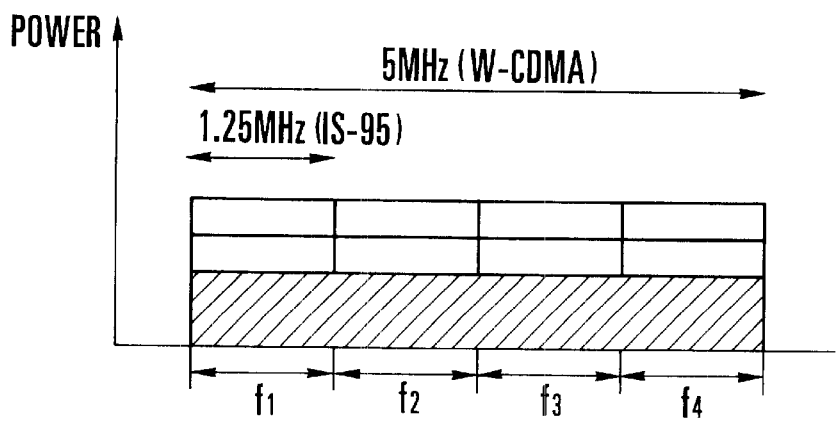
F I G. 3
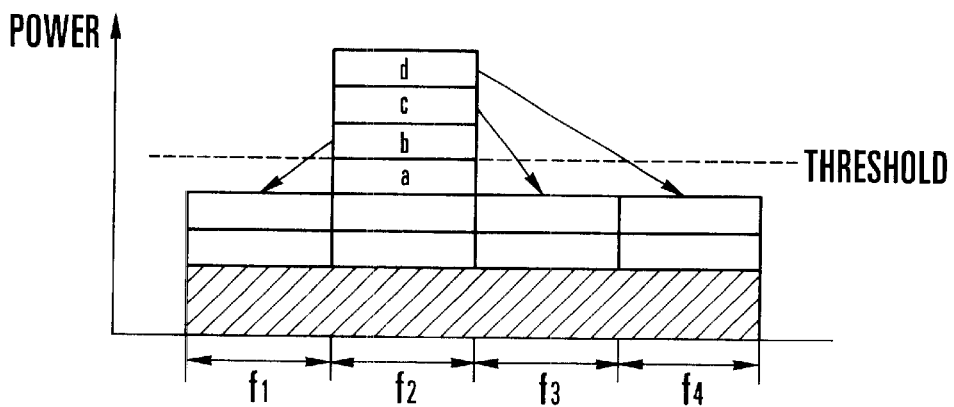
F I G. 4
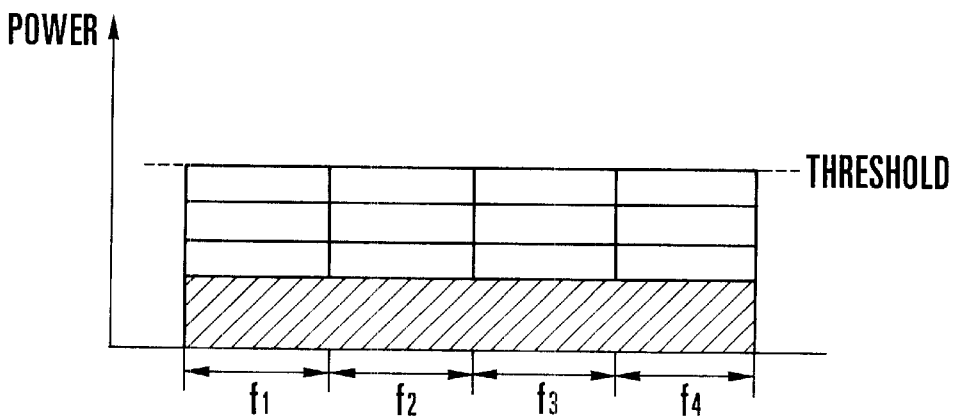
F I G. 5

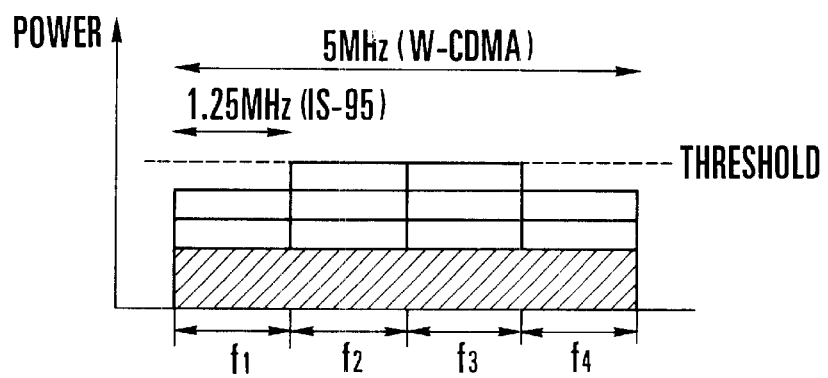
F I G. 8
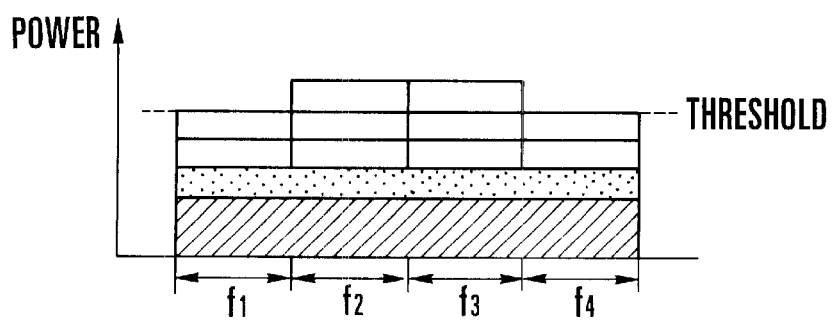
F I G. 9
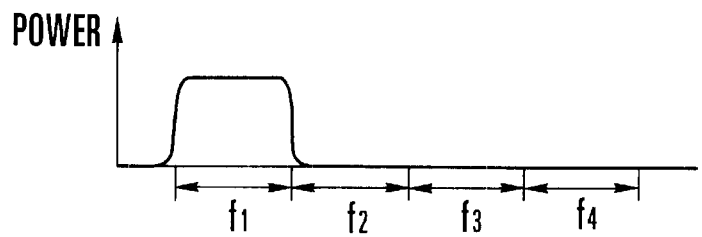
F I G. 10
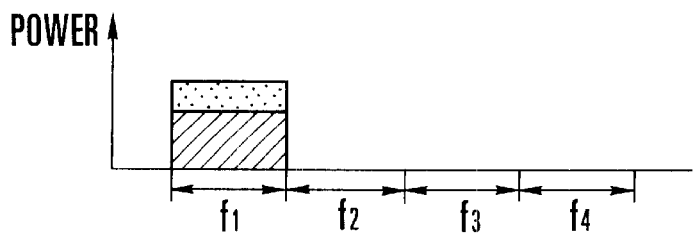
F I G. 11

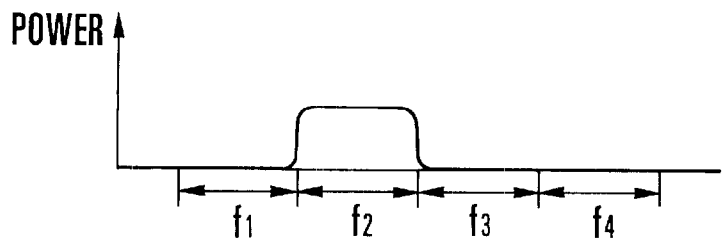
F I G. 12
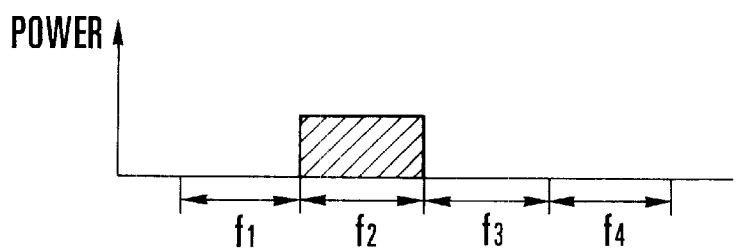
F I G. 13
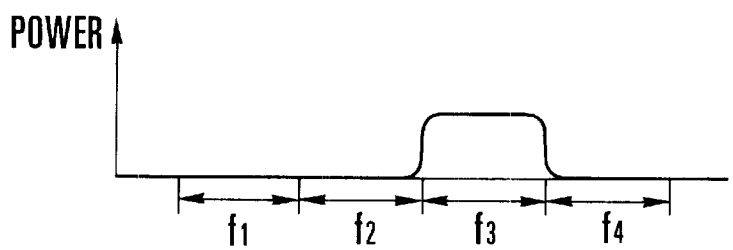
F I G. 14
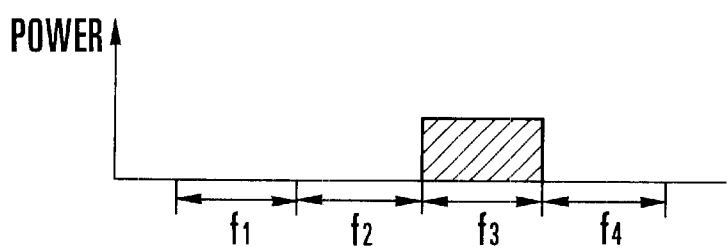
F I G. 15

IS-95 BASE STATION APPARATUS, W-CDMA BASE STATION APPARATUS, MOBILE COMMUNICATION SYSTEM, AND FREQUENCY SHARING METHOD

BACKGROUND OF THE INVENTION

The present invention relates to a mobile communication system in which base station apparatuses based on the IS-95 scheme and W-CDMA (Wide band-CDMA (Code Division Multiple Access)) scheme of the CDMA schemes as access schemes in mobile communication systems share the same frequency band within the same service area.

As a mobile communication system using the CDMA scheme, a system using the IS-95 scheme is currently used in the U.S., Korea, and the like. It is, however, expected that this system will be replaced with a system used in IMT-2000 (International Mobile Telecommunications-2000) that is a multimedia mobile communication system in the process of standardization by the ITU (International Telecommunication Union).

The W-CDMA scheme is one of the schemes, the application of which to IMT-2000 has been studied. If this W-CDMA scheme is used for IMT-2000, the currently available IS-95 scheme and W-CDMA scheme may coexist. In consideration of the effective use of frequencies as well, the IS-95 scheme and the W-CDMA scheme may use the same frequency band within the same service area.

FIGS. 19 shows the arrangement of base station apparatuses in such a case.

Referring to FIG. 19, three base station apparatuses 1 are base station apparatuses based on the IS-95 scheme, and base station apparatuses 4 are base station apparatuses based on W-CDMA scheme. When a mobile station communication system based on the IS-95 scheme and a mobile station communication system based on the W-CDMA scheme are established in the same service area, base station apparatuses based on the respective schemes coexist in the area, as shown in FIG. 19.

In the communication system based on the CDMA scheme, a plurality of communication channels can use the same frequency band. This is because each communication channel is spread-modulated with codes having orthogonality on the transmission side, and each communication can be specified by spread-demodulation (despreading) with the same codes on the reception side.

This orthogonality is made imperfect by propagation delay differences due to geographical and weather conditions and the like and time deviations due to multipath in the propagation path between the mobile station and the base station, and multipath associated with irrelevant codes, i.e., irrelevant communication, and multipath associated with relevant codes, i.e., relevant communication, have correlation components in some case. These correlation components become interference components in the relevant communication, resulting in a deterioration in communication quality. Since interference components are generated by such a factor, interference components increase as the number of communication channels increases.

The number of communication channels that can commonly use the same frequency band is therefore limited. If the total transmission power exceeds a predetermined threshold in this band, predetermined communication quality cannot be obtained. In the worst case, communication failures occur.

The arrangement of the conventional base station apparatus 1 in FIG. 19 will be described next with reference to FIG. 20.

As shown in FIG. 20, the IS-95 base station apparatus 1 is comprised of a transmission/reception amplification section 10 and a modulation/demodulation section 20. The transmission/reception amplification section 10 amplifies a reception RF (Radio Frequency) signal from a mobile station and outputs the amplified signal to the modulation/demodulation section 20. The transmission/reception amplification section 10 also amplifies a transmission RF signal from the modulation/demodulation section 20 and transmits the amplified signal to each mobile station through an antenna.

The modulation/demodulation section 20 is made up of a radio section 21, a radio base station control section 22, a FACH (Forward Access CHannel) baseband signal processing section 23, an SDCCH (Stand alone Dedicated Control CHannel) baseband signal processing section 24, a TCH (Traffic CHannel) baseband signal processing section 25, and a wire transmission path interface section 26.

The radio section 21 spreads baseband signals from the FACH baseband signal processing section 23, the SDCCH baseband signal processing section 24, and the TCH baseband signal processing section 25 with spreading codes, and synthesizes the resultant signals. The radio section 21 then D/A-converts the synthetic signal, converts the analog signal into a transmission RF signal by quadrature modulation, and outputs the signal to the transmission/reception amplification section 10. In addition, the radio section 21 converts a reception RF signal from the transmission/reception amplification section 10 into an IF (Intermediate Frequency) signal, A/D-converts it, and performs quadrature demodulation of the digital signal.

The FACH baseband signal processing section 23 is made up of an encoding section 30, a decoding section 31, and a base station FACH transmission power calculation section 32. The encoding section 30 encodes a signal from the wire transmission path interface section 26 and outputs the encoded signal as a baseband signal to the radio section 21. The decoding section 31 decodes a signal demodulated by the radio section 21 and outputs the decoded signal to the wire transmission path interface section 26.

The base station FACH transmission power calculation section 32 calculates a base station FACH transmission power value from a perch CH transmission power value, a perch CH reception SIR value, a rate correction value, and FACH specified reception SIR value according to equation (1) below. The base station FACH transmission power value is a power value required to transmit a FACH signal from the base station apparatus.

$$\text{base station } FACH \text{ transmission power value} = \text{perch } CH \text{ transmission sion power value} - (\text{mobile station perch } CH \text{ reception } SIR \text{ value} - \text{mobile station } FACH \text{ specified reception } SIR \text{ value})/ FACH \text{ rate correction value} \quad (1)$$

The FACH is a one-way channel for transmitting control information or user packet data from a base station to a mobile station. The FACH is used when the cell in which a mobile station is present is known. A FACH-L is used to transmit a relatively large amount of information, whereas a FACH-S is used to transmit a relatively small amount of information. The transmission formats for the FACH-S include a normal mode and an ACK mode. The normal mode is a mode for transmitting information about layer 3 or upper layers and packet control/user information. The ACK mode is a mode for transmitting an ACK (ACKnowledge) signal in response to a RACH (Random Access CHannel) signal received from a mobile station.

The perch CH transmission power value is a power value required to transmit a perch CH signal. This value is determined by operation information held in a base station. The perch CH is a channel for which systematic control information for each cell or sector is transmitted from a base station to a mobile station. Information whose contents change with time, e.g., SFN (System Frame Number) information and uplink interference power, is transmitted via this channel.

The perch CH reception SIR value is an SIR value obtained when a mobile station receives a perch CH signal transmitted from a base station. This information is transmitted from the mobile station to the base station via an RACH or SDCCH. The SIR (Signal Interference Ratio) is the ratio of the level of a desired signal to the level of a signal that interferes with the desired signal.

The FACH rate correction value is a value obtained by equation (2) below. This value is used to correct the influences of different transmission rates in the respective channels.

$$FACH \text{ rate correction value}=10\times\log\ (FACH \text{ transmission rate}/ \text{perch } CH \text{ transmission rate}) \quad (2)$$

The mobile station FACH specified reception SIR value is an SIR value to be obtained by a mobile station when it receives a FACH signal. This value is determined by operation information held in the base station.

Although not shown, the SDCCH baseband signal processing section 24 is also comprised of an encoding section, a decoding section, and a base station SDCCH transmission power calculation section.

The SDCCH is a two-way channel between a mobile station and a base station to transmit control information. This SDCCH is assigned to each mobile station for which connection control is performed. A transition from the SDCCH to an ACCH, which is an accessory control channel, after connection control operation is complete and a speech channel is established.

The encoding and decoding sections of the SDCCH baseband signal processing section 24 operate in the same manner as the encoding section 30 and decoding section 31 of the FACH baseband signal processing section 23.

The base station SDCCH transmission power calculation section of the SDCCH baseband signal processing section 24 calculates a base station SDCCH transmission power value from a perch CH transmission power value, a mobile station perch CH reception SIR value, an SDCCH rate correction value, and a mobile station SDCCH specified reception SIR value according to equation (3) below.

$$\text{base station } SDCCH \text{ transmission power value}=\text{perch } CH \text{ transmission power value}-(\text{mobile station perch } CH \text{ reception } SIR \text{ value}-\text{mobile station } SDCCH \text{ specified reception } SIR \text{ value})/SDCCH \text{ rate correction value} \quad (3)$$

The SDCCH rate correction value is a value obtained by equation (4) below. This value is used to correct the influences of different transmission rates in the respective channels.

$$SDCCH \text{ rate correction value}=10\times\log\ (SDCCH \text{ transmission rate}/ \text{perch } CH \text{ transmission rate}) \quad (4)$$

The mobile station SDCCH specified reception SIR value is an SIR value to be obtained by a mobile station when it receives an SDCCH signal. This value is determined by operation information held in a base station.

Although not shown, the TCH baseband signal processing section 25 is also comprised of an encoding section, a decoding section, and TCH transmission power value calculation section. A TCH is a two-way channel between a mobile station and a base station to transmit user information.

The encoding and decoding sections of the TCH baseband signal processing section 25 operate in the same manner as the encoding section 30 and decoding section 31 of the FACH baseband signal processing section 23.

The base station TCH transmission power calculation section of the TCH baseband signal processing section 25 calculates a base station TCH transmission power value from a perch CH transmission power value, a mobile station perch CH reception SIR value, a TCH rate correction value, and a mobile station FACH specified reception SIR value according to equation (5) below.

$$\text{base station } TCH \text{ transmission power value}=\text{perch } CH \text{ transmission power value}-(\text{mobile station perch } CH \text{ reception } SIR \text{ value}-\text{mobile station } TCH \text{ specified reception } SIR \text{ value})/TCH \text{ rate correction value} \quad (5)$$

The TCH rate correction value is a value obtained by equation (6) below. This value is used to correct the influences of different transmission rates in the respective channels.

$$TCH \text{ rate correction value}=10\times\log\ (TCH \text{ transmission rate/perch } CH \text{ transmission rate}) \quad (6)$$

The mobile station TCH specified reception SIR value is an SIR value to be obtained when a mobile station receives a TCH signal. This value is determined by operation information held in the base station control apparatus.

The radio base station control section 22 controls the operation of the radio section 21 and includes an adding section 40.

The adding section 40 obtains a base station transmission power value by adding the base station FACH transmission power value obtained by the base station FACH transmission power calculation section 32, the base station SDCCH transmission power value obtained by the SDCCH transmission power value calculation section, and the base station TCH transmission power value obtained by the TCH transmission power value calculation section according to equation (7).

$$\text{base station transmission power value}=\text{base station } FACH \text{ transmission power value}+\text{base station } SDCCH \text{ transmission power value}+\text{base station } TCH \text{ transmission power value} \quad (7)$$

The wire transmission path interface section 26 transfers a signal from each decoding section to a host unit 2 for controlling a plurality of IS-95 base station apparatuses, and transfers a signal from the host unit 2 to each encoding section.

The arrangement of the W-CDMA conventional base station apparatus 4 will be described next with reference to FIG. 21.

This conventional W-CDMA base station apparatus 4 has the same arrangement as that of the IS-95 base station apparatus 1 in FIG. 20 except that the frequency band used by the W-CDMA base station apparatus 4 is W-CDMA frequency band. A transmission/reception amplification section 60 and a modulation/demodulation section 70 in FIG. 21 therefore respectively correspond to the transmission/reception amplification section 10 and the modulation/demodulation section 20 in FIG. 20.

In addition, a radio section 71, a radio base station control section 72, a FACH baseband signal processing section 73, an SDCCH baseband signal processing section 74, a TCH baseband signal processing section 75, and a wire transmission path interface section 76 in FIG. 21 respectively correspond to the radio section 21, the radio base station control section 22, the FACH baseband signal processing section 23, the SDCCH baseband signal processing section 24, the TCH baseband signal processing section 25, and the wire transmission path interface section 26 in FIG. 20.

Furthermore, an encoding section 80, a decoding section 81, a FACH transmission power value calculation section 82, and an adding section 90 in FIG. 21 respectively correspond to the encoding section 30, the decoding section 31, the base station FACH transmission power calculation section 32, and the adding section 40 in FIG. 20.

Although not shown, similar to the FACH baseband signal processing section 73, the SDCCH baseband signal processing section 74 is comprised of an encoding section, a decoding section, and a TCH transmission power value calculation section. Similarly, although not shown, the TCH baseband signal processing section 75 is comprised of an encoding section, a decoding section, and a TCH transmission power value calculation section. The adding section 90 of the W-CDMA base station apparatus 4 obtains a base station transmission power value in a W-CDMA band.

Frequency bands in the IS-95 and W-CDMA schemes will be described next with reference to FIG. 22.

In the IS-95 scheme, the bandwidth of one communication channel is 1.25 MHz, whereas in the W-CDMA, the bandwidth of a band used to improve the multipath characteristics is as large as 5 MHz.

If, however, the sum of the base station transmission power of the IS-95 base station apparatus and the base station transmission power of the W-CDMA base station apparatus exceeds a certain threshold in one frequency band (frequency $f_3$) in the IS-95 scheme as shown in FIG. 22, not only the communication quality of the IS-95 mobile station using the frequency band but also the communication quality of a W-CDMA mobile station deteriorate. In some case, a communication failure occurs.

In the mobile communication system using the above conventional IS-95 base station apparatuses and W-CDMA base station apparatuses, when a frequency band is shared, and the base station transmission power exceeds a threshold in one band in the IS-95 scheme, not only the communication quality of the IS-95 mobile station using the frequency band but also the communication quality of a W-CDMA mobile station deteriorate. In some case, a communication failure occurs.

SUMMARY OF THE INVENTION

It is an object of the present invention to provide an IS-95 base station apparatus, a W-CDMA base station apparatus, a mobile communication system, and a frequency sharing method, which can prevent a deterioration in communication quality when a frequency band is shared between the IS-95 scheme and the W-CDMA scheme, and the base station transmission power exceeds a threshold in a given frequency band in the IS-95 scheme.

In order to achieve the above object, according to the present invention, there is provided a frequency sharing method in an IS-95/W-CDMA scheme in which a plurality of IS-95 base station apparatuses including first base station apparatuses and a plurality of W-CDMA base station apparatuses including second base station apparatuses are arranged in the same service area, and an IS-95 scheme and a W-CDMA scheme share the same frequency bands, comprising the steps of arranging the respective IS-95 base station apparatuses and the respective W-CDMA base station apparatuses in a one-to-one correspondence, obtaining a first base station transmission power value of the first base station apparatus in each frequency band in the IS-95 scheme, obtaining a second base station transmission power value of the second base station apparatus adjacent to the first base station apparatus, determining whether there is a frequency band in the IS-95 scheme in which a sum of the first and second base station transmission power values is not less than a predetermined threshold, and when there is a frequency band in the IS-95 scheme in which the sum is not less than the predetermined threshold, performing a frequency handoff to switch a communication channel in the IS-95 scheme which is using the frequency band in which the sum is not less than the predetermined threshold to another frequency band in the IS-95 scheme.

BRIEF DESCRIPTION OF THE DRAWINGS

FIG. 3 is a graph showing the relationship between the base station transmission power and the frequency bands when an IS-95 base station apparatus and W-CDMA base station apparatus are used in the same frequency bands;

FIG. 4 is a graph showing the relationship between the base station transmission power and the frequency bands when communication channels are newly set in the IS-95 base station apparatus;

FIG. 5 is a graph showing the relationship between the base station transmission power and the frequency bands to explain the operation of an occupied band control section in FIG. 1;

FIG. 8 is a graph showing the relationship between the base station transmission power and the frequency bands when the IS-95 base station apparatus and the W-CDMA base station apparatus are used in the same frequency bands;

FIG. 9 is a graph showing the relationship between the base station transmission power and the frequency bands when communication channels are newly set in the W-CDMA base station apparatus;

FIG. 10 is a graph showing the characteristic of a bandpass filter (frequency band $f_1$) used for band limiting in the W-CDMA base station apparatus in FIG. 6;

FIG. 11 is a graph showing the relationship between the base station transmission power and the frequency bands in a case wherein the bandpass filter having the characteristic shown in FIG. 10 is used;

FIG. 12 is a graph showing the characteristic of a bandpass filter (frequency band $f_2$) used for band limiting in the W-CDMA base station apparatus in FIG. 6;

FIG. 13 is a graph showing the relationship between the base station transmission power and the frequency bands in a case wherein the bandpass filter having the characteristic shown in FIG. 12 is used;

FIG. 14 is a graph showing the characteristic of a bandpass filter (frequency band $f_3$) used for band limiting in the W-CDMA base station apparatus in FIG. 6;

FIG. 15 is a graph showing the relationship between the base station transmission power and the frequency bands in a case wherein the bandpass filter having the characteristic shown in FIG. 14 is used;

DESCRIPTION OF THE PREFERRED EMBODIMENTS

The present invention will be described in detail below with reference to the accompanying drawings.

(First Embodiment)

A mobile communication system according to the first embodiment of the present invention will be described first.

Figure 1:
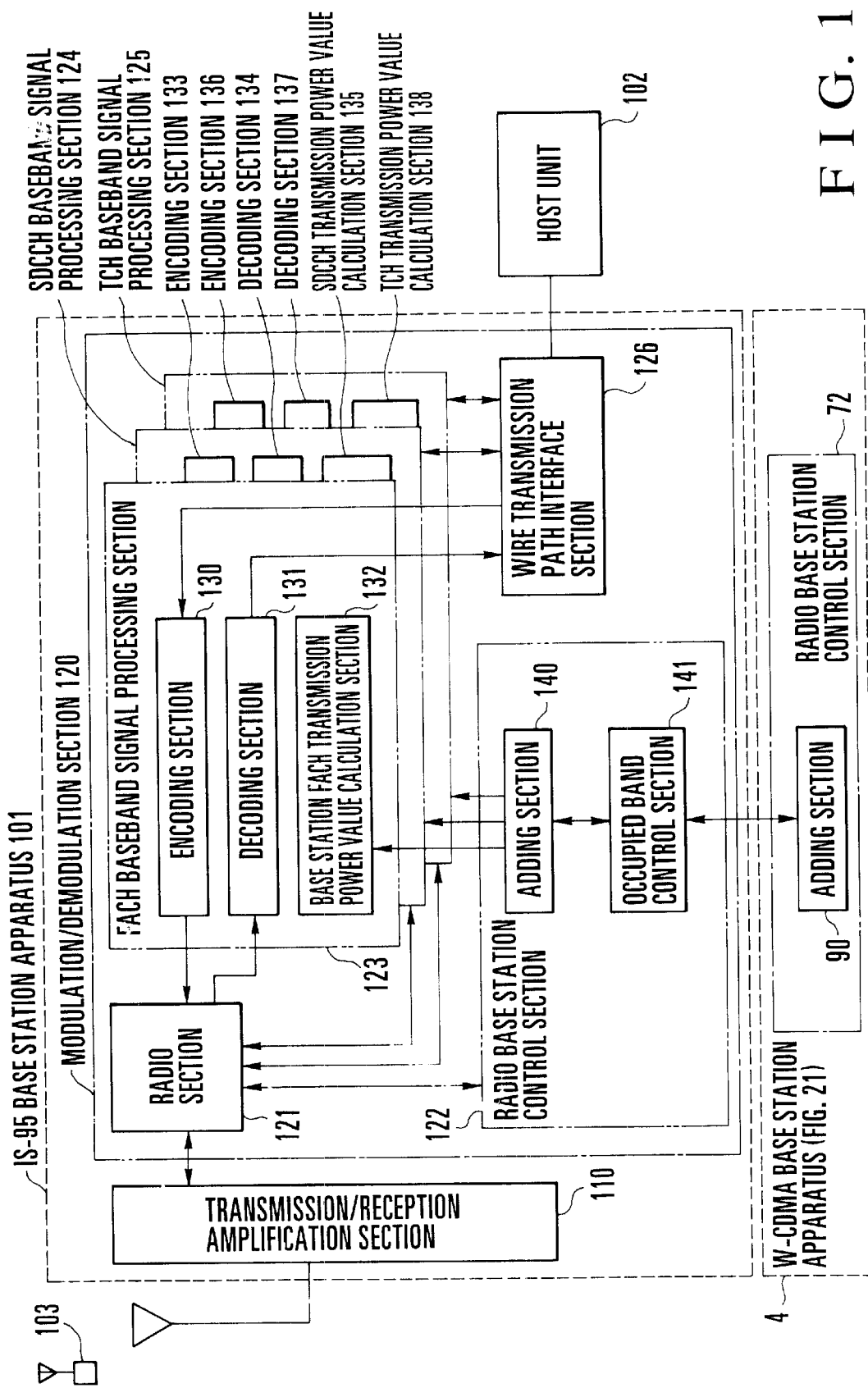
FIG. 1 is a block diagram showing an IS-95 base station apparatus according to the first embodiment of the present invention.
Figure 2:
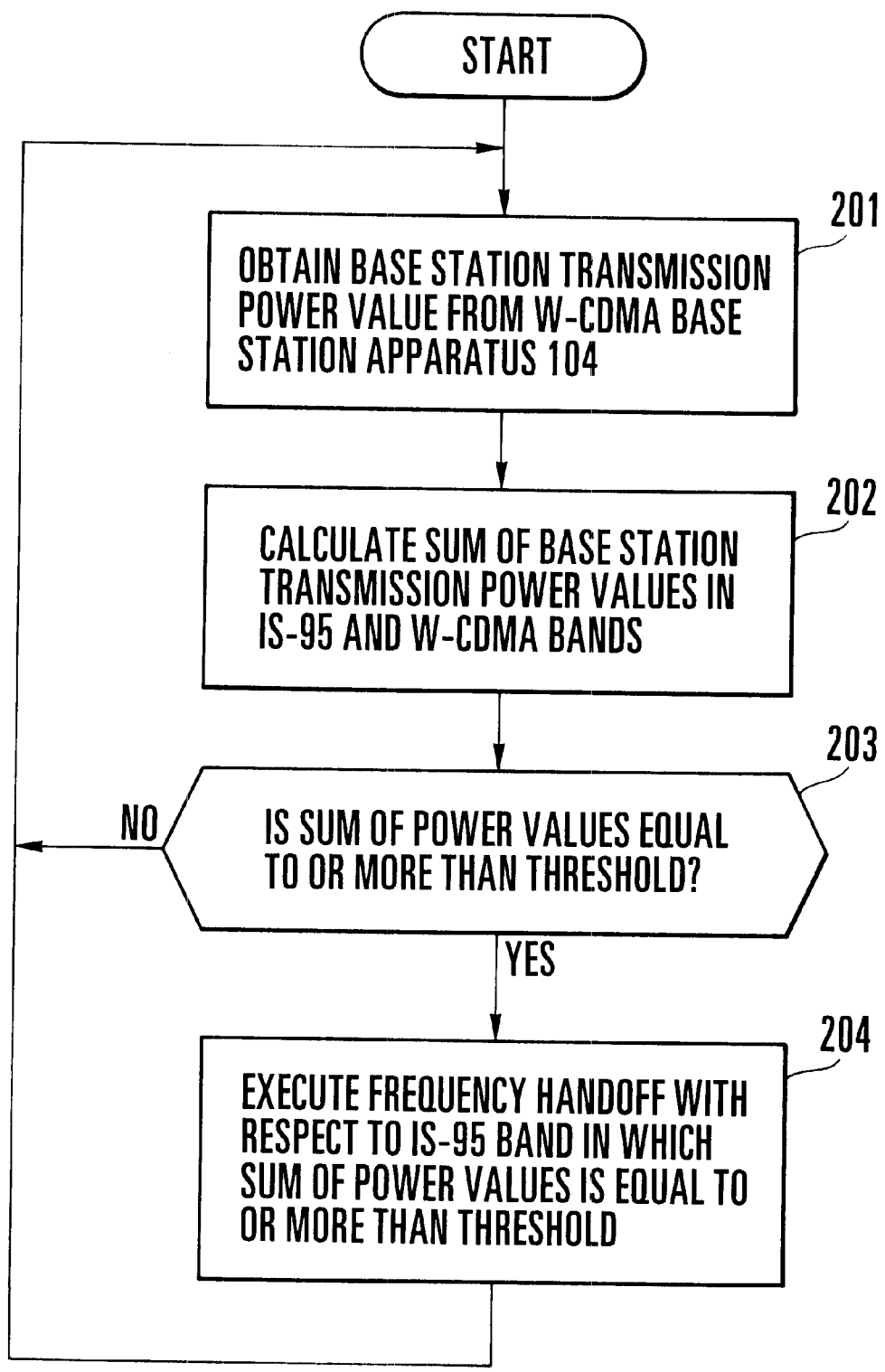
FIG. 2 is a flow chart for explaining the frequency handoff operation of the IS-95 base station apparatus in FIG. 1.

FIG. 1 shows an IS-95 base station apparatus in a mobile communication system according to the first embodiment of the present invention.

An IS-95 base station apparatus 101 is comprised of a transmission/reception amplification section 110 and a modulation/demodulation section 120. The transmission/reception amplification section 110 amplifies a reception RF signal from a mobile station 103 and outputs the amplified signal to the modulation/demodulation section 120. The transmission/reception amplification section 110 also amplifies a transmission RF signal from the modulation/demodulation section 120 and transmits the amplified signal to each mobile station through an antenna.

The modulation/demodulation section 120 is made up of a radio section 121, a radio base station control section 122, a FACH baseband signal processing section 123, an SDCCH baseband signal processing section 124, a TCH baseband signal processing section 125, and a wire transmission path interface section 126.

The radio section 121 spreads baseband signals from the FACH baseband signal processing section 123, the SDCCH baseband signal processing section 124, and the TCH baseband signal processing section 125 with spreading codes, and synthesizes the resultant signals. The radio section 121 then D/A-converts the synthetic signal, converts the analog signal into a transmission RF signal by quadrature modulation, and outputs it to the transmission/reception amplification section 110. The radio section 121 converts a reception RF signal from the transmission/reception amplification section 110 into an IF signal, A/D-converts the IF signal, and performs quadrature demodulation.

The FACH baseband signal processing section 123 is made up of an encoding section 130, a decoding section 131, and a base station FACH transmission power value calculation section 132. The encoding section 130 encodes a signal from the wire transmission path interface section 126 and outputs the encoded signal as a baseband signal to the radio section 121. The decoding section 131 decodes the signal demodulated by the radio section 121 and outputs the decoded signal to the wire transmission path interface section 126.

The base station FACH transmission power value calculation section 132 calculates a base station FACH transmission power value from a perch CH transmission power value, a perch CH reception SIR value, a rate correction value, and a FACH specified reception SIR value according to equation (1) above.

The SDCCH baseband signal processing section 124 is made up of an encoding section 133, a decoding section 134, and a base station SDCCH transmission power calculation section 135. The encoding section 133 and the decoding section 134 operate in the same manner as the encoding section 130 and decoding section 131 of the FACH baseband signal processing section 123.

The base station SDCCH transmission power calculation section 135 calculates a base station SDCCH transmission power value from a perch CH transmission power value, a mobile station perch CH reception SIR value, an SDCCH rate correction value, a mobile station SDCCH specified reception SIR value according to equation (3) above.

The TCH baseband signal processing section 125 is made up of an encoding section 136, a decoding section 137, an a TCH transmission power value calculation section 138. The encoding section 136 and the decoding section 137 operate in the same manner as the encoding section 130 and decoding section 131 of the FACH baseband signal processing section 123.

The TCH transmission power value calculation section 138 obtains a base station TCH transmission power value from a perch CH transmission power value, a mobile station perch CH reception SIR value, a TCH rate correction value, and a mobile station FACH specified reception SIR value according to equation (5) above.

The radio base station control section 122 includes an adding section 140 and an occupied band control section 141 and controls the operation of the radio section 121.

The adding section 140 obtains a base station transmission power value according to equation (7) above on the basis of the base station FACH transmission power value obtained by the base station FACH transmission power value calculation section 132, the base station SDCCH transmission power value obtained by the base station SDCCH transmission power calculation section 135, and the base station TCH transmission power value obtained by the TCH transmission power value calculation section 138.

The wire transmission path interface section 126 transfers signals from the decoding sections 131, 134, and 137 to the host unit 2 for controlling a plurality of IS-95 base station apparatuses, and transfers signals from the host unit 2 to the encoding sections 130, 133, and 136.

The occupied band control section 141 adds the base station transmission power value obtained by the adding section 140 in each frequency band in the IS-95 scheme and the base station transmission power value obtained by an adding section 90 of an adjacent W-CDMA base station apparatus 104 in each W-CDMA band. If the obtained sum exceeds a predetermined threshold, frequency handoff processing is performed to switch the communication channel in the IS-95 band in which the threshold is exceeded to another IS-95 band.

Figure 21:
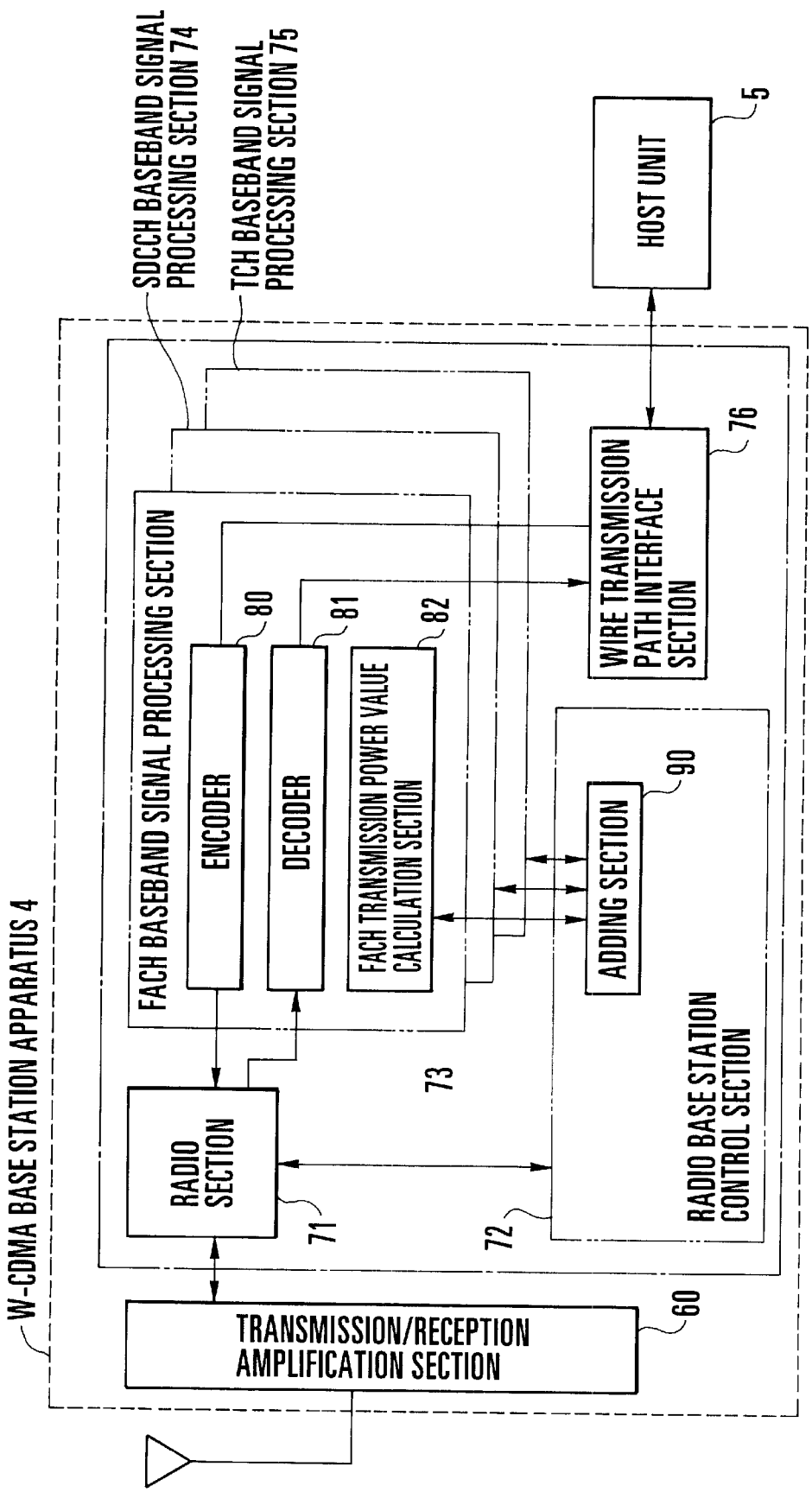
FIG. 21 is a block diagram showing a conventional W-CDMA base station apparatus.
Figure 22:
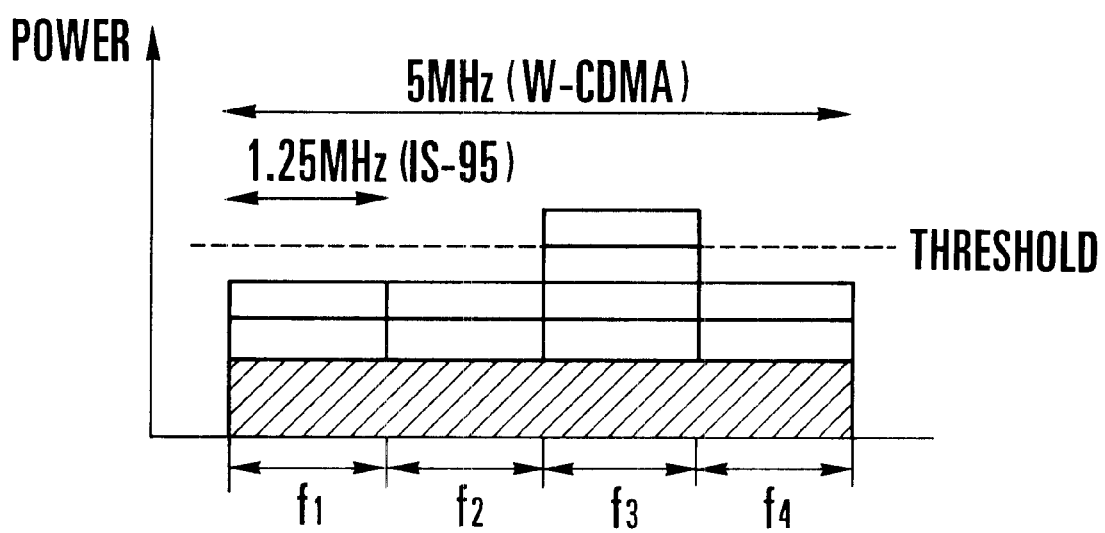
FIG. 22 is a graph showing the relationship between the base station transmission power and the frequency bands in a case wherein the IS-95 scheme and the W-CDMA scheme are used in the same service area.

In the mobile communication system of this embodiment, the plurality of IS-95 base station apparatuses 101 are arranged to be adjacent to the plurality of conventional W-CDMA base station apparatuses 4 (FIG. 21) in a one-toone correspondence with each other. The occupied band control section 141 of the IS-95 base station apparatus 101 is connected to the adding section 90 of the adjacent conventional W-CDMA base station apparatus 4.

The operation of this embodiment will be described next with reference to FIGS. 2 to 5. Assume that in the following description, communication channels a, b, c, and d based on the IS-95 scheme are set in one frequency band $f_2$ of the frequency bands in the IS-95 scheme, as shown in FIG. 4.

FIG. 3 shows the base station transmission power when an IS-95 mobile communication system and a W-CDMA mobile communication system are used in the same frequency band. Referring to FIG. 3, the hatched portion indicates the transmission power value output from a W-CDMA base station apparatus.

First of all, the adding section 140 calculates a base station transmission power value by adding the base station FACH transmission power value calculated by the base station FACH transmission power value calculation section 132, the base station SDCCH transmission power value calculated by the base station SDCCH transmission power calculation section 135 of the SDCCH baseband signal processing section 124, and the base station TCH transmission power value calculated by the TCH transmission power value calculation section 138 of the TCH baseband signal processing section 125 in units of IS-95 bands.

The occupied band control section 141 obtains the base station transmission power value of the W-CDMA base station apparatus 4 from the adding section 90 of the W-CDMA base station apparatus 4 (step S201).

The occupied band control section 141 adds the base station transmission power value in the IS-95 band, which is output from the adding section 140, and the base station transmission power value in the W-CDMA band, which is output from the adding section 90 (step S202). The occupied band control section 141 then checks whether the sum exceeds the threshold (step S203). If the sum exceeds the threshold, a frequency handoff is performed to switch the communication channel using the IS-95 frequency band in which the sum exceeds the threshold to another IS-95 frequency band (step S204).

More specifically, as shown in FIG. 4, the frequency handoff is performed such that the communication channel b is switched from the frequency band $f_2$ to a frequency band $f_1$, the communication channel c is switched to a frequency band $f_3$, and the communication channel d is switched to a frequency band $f_4$. With this operation, as shown in FIG. 5, the base station transmission power values in the respective bands $f_1$ to $f_4$ are made equal, and there is no frequency band in which the base station transmission power value exceeds the threshold.

Even if frequency bands are shared between the IS-95 scheme and the W-CDMA scheme, this embodiment can prevent a deterioration in communication quality and a communication failure when the transmission power value in a specific frequency band in the IS-95 scheme exceeds the threshold.

(Second Embodiment)

A mobile communication system according to the second embodiment of the present invention will be described next.

Figure 6:
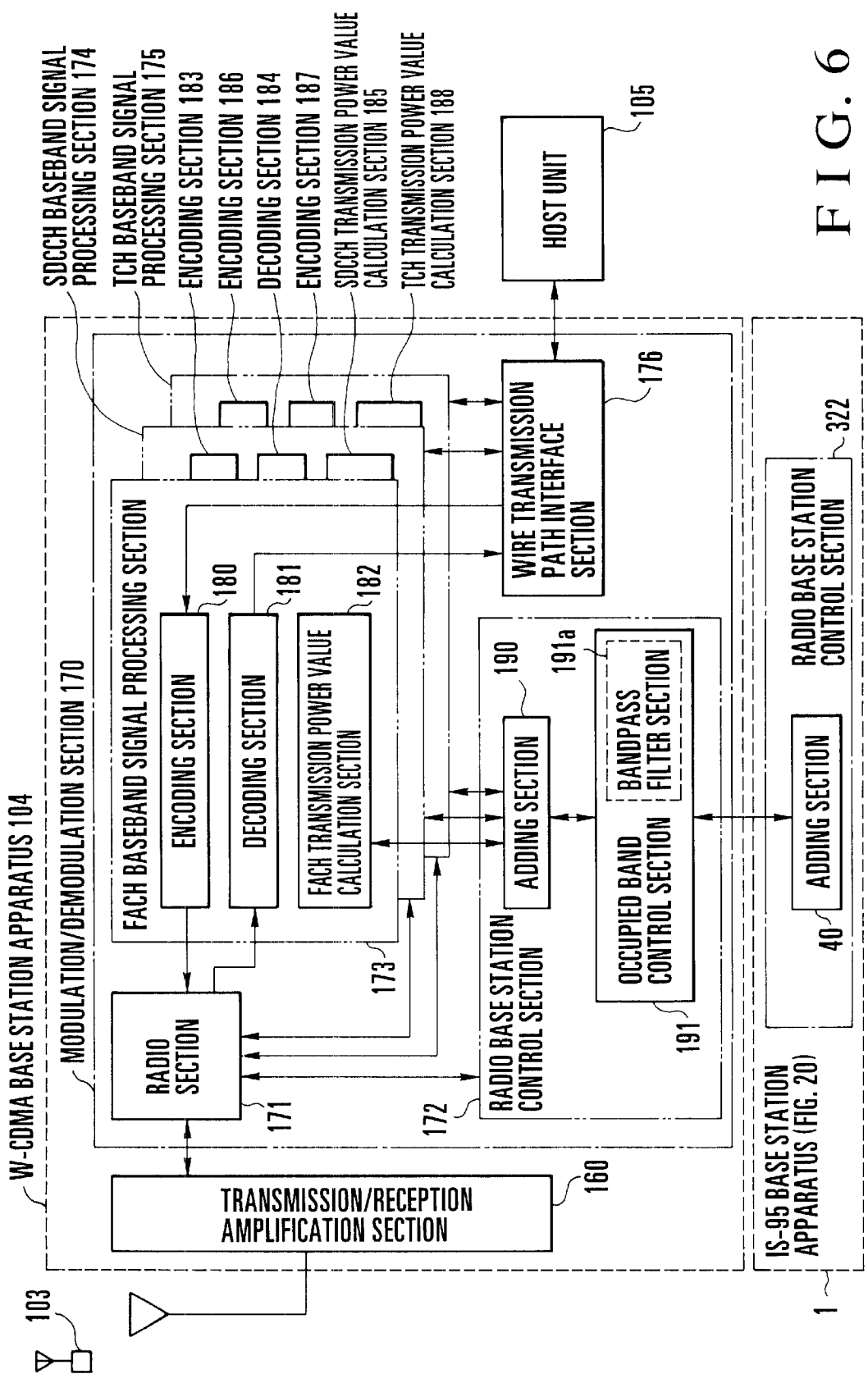
FIG. 6 is a block diagram showing a W-CDMA base station apparatus according to the second embodiment of the present invention.
Figure 7:
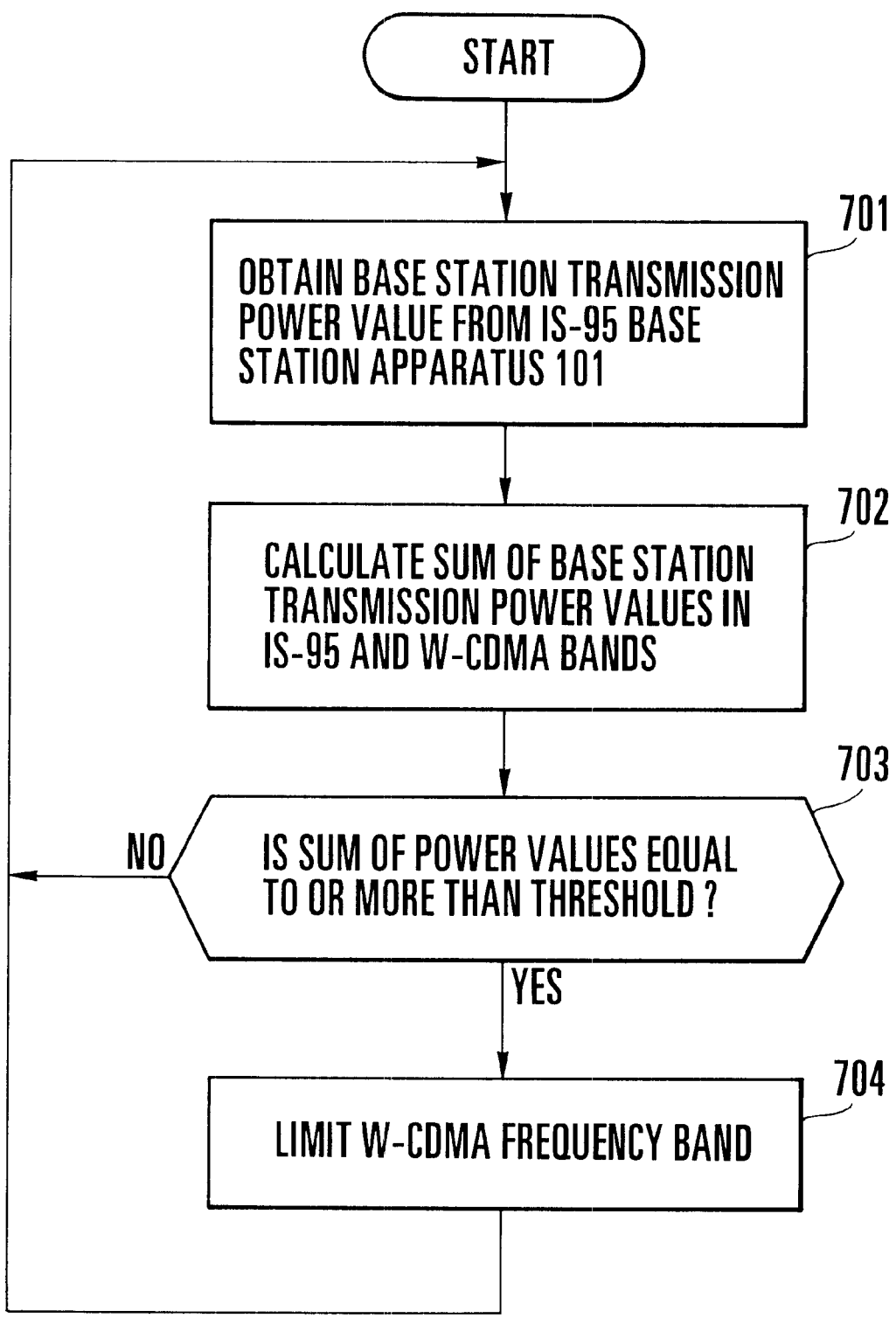
FIG. 7 is a flow chart for explaining the frequency band limiting operation of the W-CDMA base station apparatus in FIG. 6.

FIG. 6 shows the arrangement of a W-CDMA base station apparatus 104 of this embodiment. The W-CDMA base station apparatus 104 in FIG. 6 has the same arrangement as that of the IS-95 base station apparatus 101 in FIG. 1 except that W-CDMA frequency bands are used. A transmission/reception amplification section 160 and a modulation/demodulation section 170 in FIG. 6 therefore respectively correspond to the transmission/reception amplification section 110 and the modulation/demodulation section 120 in FIG. 1.

In addition, a radio section 171, a radio base station control section 172, a FACH baseband signal processing section 173, an SDCCH baseband signal processing section 174, a TCH baseband signal processing section 175, and a wire transmission path interface section 176 in FIG. 6 respectively correspond to the radio section 121, the radio base station control section 122, the FACH baseband signal processing section 123, the SDCCH baseband signal processing section 124, the TCH baseband signal processing section 125, and the wire transmission path interface section 126 in FIG. 1.

Furthermore, an encoding section 180, a decoding section 181, a FACH transmission power value calculation section 182, and an adding section 190 in FIG. 6 respectively correspond to the encoding section 130, the decoding section 131, the base station FACH transmission power value calculation section 132, and the adding section 140 in FIG. 1.

Similar to the FACH baseband signal processing section 173, the SDCCH baseband signal processing section 174 is comprised of an encoding section 183, a decoding section 184, and a TCH transmission power value calculation section 185. The TCH baseband signal processing section 175 is made up of an encoding section 186, a decoding section 187, and a TCH transmission power value calculation section 188.

The radio base station control section 172 includes the adding section 190 for obtaining a base station transmission power value in a W-CDMA band and an occupied band control section 191 having a bandpass filter section 191a.

Figure 20:
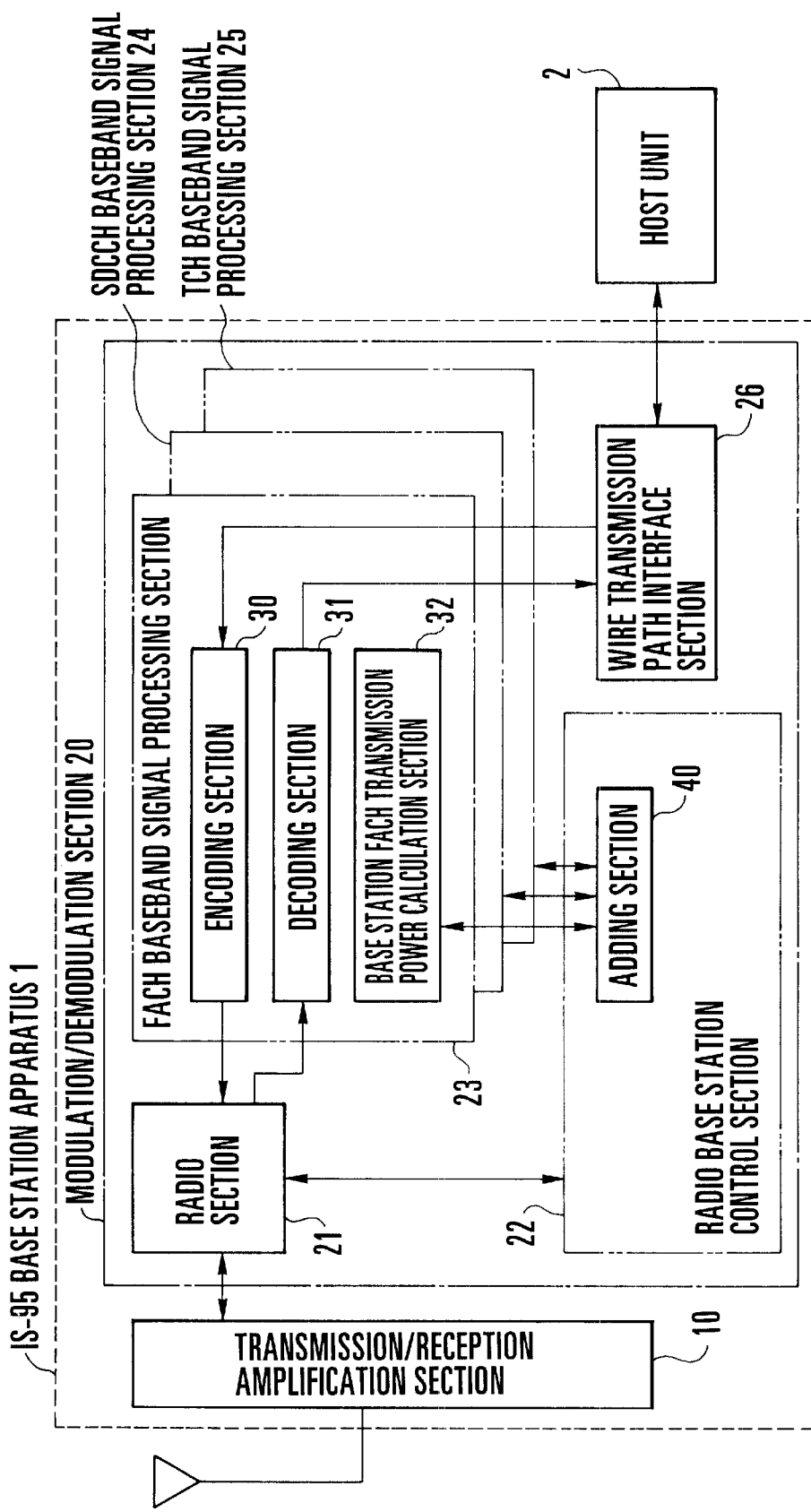
FIG. 20 is a block diagram showing a conventional IS-95 base station apparatus.

The occupied band control section 191 adds the base station transmission power value in each W-CDMA frequency band, which is obtained by the adding section 190, and the base station transmission power value in each IS-95 frequency band, which is obtained by the adding section 40 of the conventional IS-95 base station apparatus 1 (FIG. 20). If the sum exceeds a predetermined threshold, a portion of the frequency band used by the W-CDMA scheme in which the sum of base station transmission power values exceeds the threshold value is band-limited.

In the mobile communication system of this embodiment, the plurality of W-CDMA base station apparatuses 104 are arranged to be adjacent to the conventional IS-95 base station apparatuses 1 in a one-to-one correspondence with each other. The occupied band control section 191 of the W-CDMA base station apparatus 104 is connected to the adding section 40 of the adjacent IS-95 base station apparatus 1.

A method by which the occupied band control section 191 band-limits a given portion of a frequency band in the W-CDMA scheme will be described next with reference to FIGS. 8 to 18.

FIG. 8 shows the base station transmission power when an IS-95 mobile communication system and a W-CDMA mobile communication system are used in the same frequency band. Referring to FIG. 8, the hatched portion indicates the transmission power value output from a W-CDMA base station apparatus.

In this case, as shown in FIG. 9, when the base station transmission power value in the W-CDMA scheme, which is indicated by the hatched portion, is to be increased by the dot display portion, the sums of the base station transmission power values in the W-CDMA scheme and the base station transmission power values in the IS-95 scheme exceed the threshold in frequency bands $f_2$ and $f_3$.

Band control operation in such a case will be described below. The occupied band control section 191 selects (sets) a bandpass filter (frequency band $f_1$) having a characteristic like the one shown in FIG. 10 in the bandpass filter section 191a, and lets transmission signals from the W-CDMA base station apparatus 104 pass through the filter. With this operation, a transmission signal having a power value like the one shown in FIG. 11 can be obtained.

Figure 16:
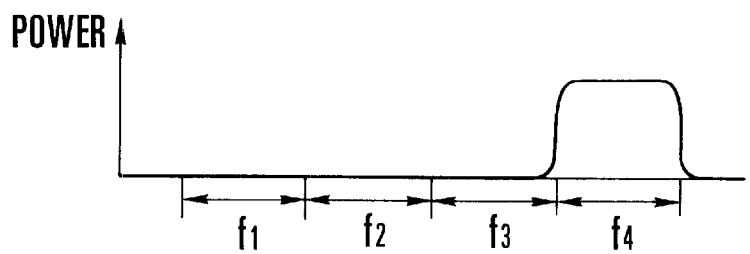
FIG. 16 is a graph showing the characteristic of a bandpass filter (frequency band $f_4$) used for band limiting in the W-CDMA base station apparatus in FIG. 6.
Figure 17:
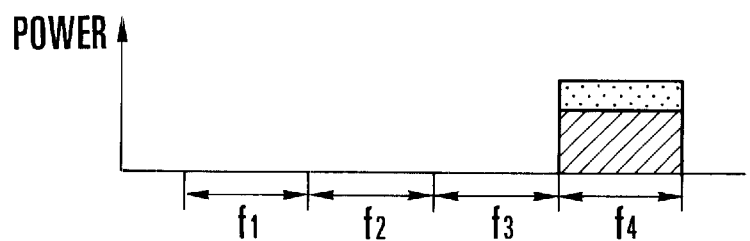
FIG. 17 is a graph showing the relationship between the base station transmission power and the frequency bands in a case wherein the bandpass filter having the characteristic shown in FIG. 16 is used.

Similarly, the occupied band control section 191 selects (sets) bandpass filters (frequency band $f_1$) having characteristics like those shown in FIGS. 12, 14, and 16, and lets transmission signals from the W-CDMA base station apparatus 104 pass through the filters. With this operation, transmission signals having power values like those shown in FIGS. 13, 15, and 17 can be obtained.

In this case, the bandpass filters that pass signals in the frequency bands $f_2$ and $f_3$ have limiters for cutting signals having power values larger than a predetermined value, and hence the passage of transmission signal components corresponding to the check pattern portion in FIG. 9 is inhibited. In contrast to this, the bandpass filters that pass signals in frequency bands $f_1$ and $f_4$ have no limiter function, and hence pass transmission signal components including the dot display portion.

Figure 18:
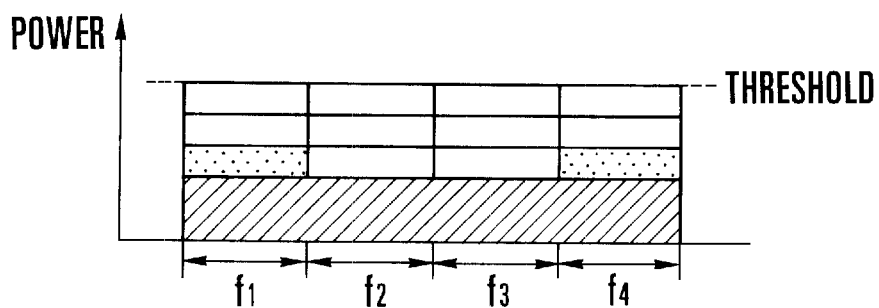
FIG. 18 is a frequency band chart for explaining the operation of the W-CDMA base station apparatus 4 in FIG. 6.
Figure 19:
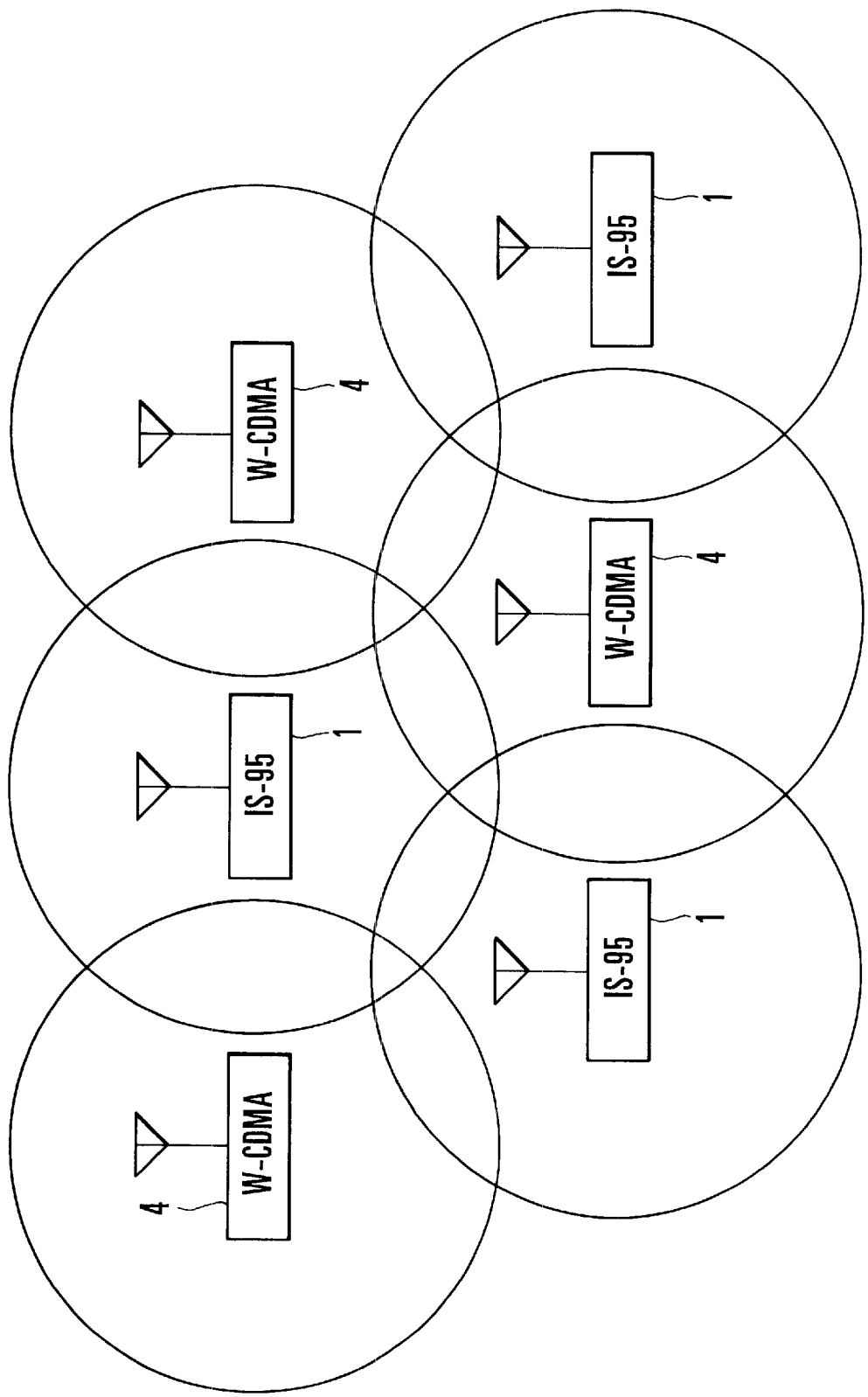
FIG. 19 is a view showing the arrangement of a mobile communication system comprised of IS-95 base station apparatuses and W-CDMA base station apparatuses.

FIG. 18 shows the power values of signals obtained by adding these transmission signals and the values obtained by adding the base station transmission power values in the IS-95 scheme. As shown in FIG. 18, in the frequency bands $f_2$ and $f_3$ in which the base station transmission power values in the IS-95 scheme are large, the base station transmission power values in the W-CDMA scheme are reduced by band limiting, and hence the sums of the transmission power values do not exceed the threshold.

According to this embodiment, although limitations on frequency bands degrade the interference wave removing ability and the like, communications can be performed. Therefore, such a disadvantage is not serious as compared with the case wherein a deterioration in communication quality or communication failure occurs when the base station transmission power value exceeds the threshold.

In the first embodiment, the IS-95 base station apparatus 101 of the present invention is combined with the conventional W-CDMA base station apparatus 4. In the second embodiment, the conventional IS-95 base station apparatus 1 is combined with the W-CDMA base station apparatus 104 of the present invention. As is obvious, however, the IS-95 base station apparatus 101 can be combined with the W-CDMA base station apparatus 104.

As has been described above, when frequencies are shared between the IS-95 scheme and the W-CDMA scheme, the present invention can prevent the base station transmission power value in a given band in the IS-95 scheme from exceeding the threshold.

What is claimed is:

1. A frequency sharing method in an IS-95/W-CDMA scheme in which a plurality of IS-95 base station apparatuses including first base station apparatuses and W-CDMA base station apparatuses including second base station apparatuses are arranged in a same service area, and an IS-95 scheme and a W-CDMA scheme share same frequency bands, comprising the steps of:

arranging said plurality of IS-95 base station apparatuses and said plurality of W-CDMA base station apparatuses in a one-to-one correspondence;

obtaining a first base station transmission power value of one of said first base station apparatuses in each frequency band in the IS-95 scheme;

obtaining second base station transmission power values of ones of said second base station apparatuses adjacent to said one first base station apparatus;

determining whether there is a frequency band in the IS-95 scheme in which a sum of the first and second base station transmission power values is not less than a predetermined threshold; and when there is a frequency band in the IS-95 scheme in which the sum is not less than the predetermined threshold, performing frequency handoff to switch a communication channel in the IS-95 scheme which is using the frequency band in which the sum is not less than the predetermined threshold to another frequency band in the IS-95 scheme.

2. A method according to claim 1, wherein the step of obtaining the first and second base station transmission power values comprises the step of obtaining a first base station transmission power value by adding, in units of frequency bands, a base station FACH (Forward Access CHannel) transmission power value as a power value set for transmission via a FACH representing a one-way channel used to transmit control information/user packet data from a base station to a mobile station, a base station SDCCH (Stand alone Dedicated Control CHannel) transmission power value as a power value set for transmission via an SDCCH representing a two-way channel used to transmit control information between the base station and the mobile station, and a base station TCH (Traffic CHannel) transmission power value as a power value set for transmission via a TCH representing a two-way channel used to transmit user information between the base station and the mobile station.

3. A frequency sharing method in an IS-95/W-CDMA scheme in which a plurality of IS-95 base station apparatuses including first base station apparatuses and W-CDMA base station apparatuses including second base station apparatuses are arranged in a same service area, and an IS-95 scheme and a W-CDMA scheme share same frequency bands, comprising the steps of:

arranging said plurality of IS-95 base station apparatuses and said plurality of W-CDMA base station apparatuses in a one-to-one correspondence;

obtaining a first base station transmission power value of one of said first base station apparatus in each frequency band in the IS-95 scheme;

obtaining second base station transmission power values of ones of said second base station apparatuses adjacent to said one first base station apparatus;

determining whether there is a frequency band in the IS-95 scheme in which a sum of the first and second base station transmission power values is not less than a predetermined threshold; and band-limiting a portion of a frequency band used by the W-CDMA scheme in which the sum of the base station transmission power values is not less than the predetermined threshold.

4. A method according to claim 3, wherein the step of obtaining the first base station transmission power value comprises the step of obtaining a first base station transmission power value by adding, in units of frequency bands, a base station FACH (Forward Access CHannel) transmission power value as a power value set for transmission via a FACH representing a one-way channel used to transmit control information/user packet data from a base station to a mobile station, a base station SDCCH (Stand alone Dedicated Control CHannel) transmission power value as a power value set for transmission via an SDCCH representing a two-way channel used to transmit control information between the base station and the mobile station, and a base station TCH (Traffic CHannel) transmission power value as a power value set for transmission via a TCH representing a two-way channel used to transmit user information between the base station and the mobile station.

5. An IS-95 base station apparatus comprising:
   first calculation means for calculating a base station FACH (Forward Access CHannel) transmission power value as a power value set for transmission via a FACH representing a one-way channel used to transmit control information/user packet data from a base station to a mobile station;
   second calculation means for calculating a base station SDCCH (Stand alone Dedicated Control CHannel) transmission power value as a power value set for transmission via an SDCCH representing a two-way channel used to transmit control information between the base station and the mobile station;
   third calculation means for calculating a base station TCH (Traffic CHannel) transmission power value as a power value set for transmission via a TCH representing a two-way channel used to transmit user information between the base station and the mobile station;
   adding means for adding the transmission power values output from said first to third calculation means in units of frequency bands in an IS-95 scheme to calculate a base station transmission power value; and
   occupied band control means for, when there is a frequency band in the IS-95 scheme in which a sum of a base station transmission power value of an adjacent W-CDMA base station apparatus which is notified from said adjacent W-CDMA base station apparatus and the base station transmission power value output from said adding means in units of frequency bands in the IS-95 scheme is not less than a predetermined threshold, performing a frequency handoff to switch a communication channel using the frequency band in which the sum is not less than the threshold to another frequency band.

6. An apparatus according to claim 5, wherein said first calculation means calculates a base station FACH transmission power value based on a perch CH (CHannel) transmission power value indicating a power value for transmission via a perch CH used to notify systematic control information about each cell/sector from a base station to a mobile station, a mobile station perch CH reception SIR value indicating an SIR when the mobile station receives a signal transmitted from the base station via a perch CH, a mobile station FACH specified reception SIR value indicating an SIR value to be obtained when the mobile station is to receive a signal via a FACH, and a FACH rate correction value for correcting influences of different transmission rates in the CHs,
   said second calculation means calculates a base station SDCCH transmission power value based on a perch CH transmission power value, a mobile station perch CH reception SIR value, a mobile station SDCCH specified reception SIR value indicating an SIR value to be obtained when the mobile station is to receive a signal via an SDCCH, and an SDCCH rate correction value for correcting influences of different transmission rates in the CHs, and
   said third calculation means calculates a base station TCH transmission power value based on a perch CH transmission power value, a mobile station perch CH reception SIR value, a mobile station TCH specified reception SIR value indicating an SIR value to be obtained when the mobile station is to receive a signal via a TCH, and a TCH rate correction value for correcting influences of different transmission rates in the CHs.

7. A mobile communication system comprising:
   at least one mobile station;
   a plurality of IS-95 base station apparatuses for performing radio communications with said mobile stations by using an IS-95 scheme;
   a plurality of W-CDMA base station apparatuses which share same frequency bands set in a same service area with said IS-95 base station apparatuses, and perform radio communications with said mobile stations by using a W-CDMA scheme; and
   a host unit to which said IS-95 base station apparatuses are connected,
   each of said IS-95 base station apparatuses including:
      first calculation means for calculating a base station FACH transmission power value as a power value for transmission via a FACH representing a one-way channel used to transmit control information/user packet data from said IS-95 base station apparatus to said at least one mobile station;
      second calculation means for calculating a base station SDCCH (Stand alone Dedicated Control CHannel) transmission power value as a power value set for transmission via an SDCCH representing a two-way channel used to transmit control information between said IS-95 base station apparatus and said at least one mobile station;
      third calculation means for calculating a base station TCH (Traffic CHannel) transmission power value as a power value set for transmission via a TCH representing a two-way channel used to transmit user information between said IS-95 base station apparatus and said at least one mobile station;
      adding means for adding the transmission power values output from said first to third calculation means in units of frequency bands in the IS-95 scheme to calculate a base station transmission power value; and
      occupied band control means for, when there is a frequency band in the IS-95 scheme in which a sum of a base station transmission power value of an adjacent W-CDMA base station apparatus which is notified from each of said adjacent W-CDMA base station apparatuses and the base station transmission power value output from said adding means in units of frequency bands in the IS-95 scheme is not less than a predetermined threshold, performing a frequency handoff to switch a communication channel using the frequency band in which the sum is not less than the threshold to another frequency band.

8. A W-CDMA base station apparatus comprising:
   first calculation means for calculating a base station FACH transmission power value as a power value for transmission via a FACH representing a one-way channel used to transmit control information/user packet data from said W-CDMA base station apparatus to a mobile station;
   second calculation means for calculating a base station SDCCH (Stand alone Dedicated Control CHannel) transmission power value as a power value set for transmission via an SDCCH representing a two-way channel used to transmit control information between said W-CDMA base station apparatus and said mobile station;

third calculation means for calculating a base station TCH (Traffic CHannel) transmission power value as a power value set for transmission via a TCH representing a two-way channel used to transmit user information between said W-CDMA base station apparatus and said mobile station;

adding means for adding the transmission power values output from said first to third calculation means in units of frequency bands in an IS-95 scheme to calculate a base station transmission power value; and occupied band control means for, when there is a frequency band in the IS-95 scheme in which a sum of a base station transmission power value of an adjacent IS-95 base station apparatus which is notified from said adjacent IS-95 base station apparatus and the base station transmission power value output from said adding means is not less than a predetermined threshold, band-limiting a frequency band portion, of frequency bands used by the W-CDMA scheme, in which the sum of the base station transmission power values is not less than the threshold.

9. An apparatus according to claim 8, wherein said first calculation means calculates a base station FACH transmission power value based on a perch CH (CHannel) transmission power value indicating a power value for transmission via a perch CH used to notify systematic control information about each cell/sector from a base station to a mobile station, a mobile station perch CH reception SIR value indicating an SIR when the mobile station receives a signal transmitted from the base station via a perch CH, a mobile station FACH specified reception SIR value indicating an SIR value to be obtained when the mobile station is to receive a signal via a FACH, and a FACH rate correction value for correcting influences of different transmission rates in the CHs, said second calculation means calculates a base station SDCCH transmission power value based on a perch CH transmission power value, a mobile station perch CH reception SIR value, a mobile station SDCCH specified reception SIR value indicating an SIR value to be obtained when the mobile station is to receive a signal via an SDCCH, and an SDCCH rate correction value for correcting influences of different transmission rates in the CHs, and said third calculation means calculates a base station TCH transmission power value based on a perch CH transmission power value, a mobile station perch CH reception SIR value, a mobile station TCH specified reception SIR value indicating an SIR value to be obtained when the mobile station is to receive a signal via a TCH, and a TCH rate correction value for correcting influences of different transmission rates in the CHs.

10. A mobile communication system comprising:

at least one mobile station;

a plurality of IS-95 base station apparatuses for performing radio communications with said mobile stations by using an IS-95 scheme;

a plurality of W-CDMA base station apparatuses which share same frequency bands set in a same service area with said IS-95 base station apparatuses, and perform radio communications with said mobile stations by using a W-CDMA scheme; and a host unit to which said W-CDMA base station apparatuses are connected, each of said W-CDMA base station apparatuses including:

first calculation means for calculating a base station FACH transmission power value as a power value for transmission via a FACH representing a one-way channel used to transmit control information/user packet data from said base station to said mobile station;

second calculation means for calculating a base station SDCCH (Stand alone Dedicated Control CHannel) transmission power value as a power value set for transmission via an SDCCH representing a two-way channel used to transmit control information between said base station and said mobile station;

third calculation means for calculating a base station TCH (Traffic CHannel) transmission power value as a power value set for transmission via a TCH representing a two-way channel used to transmit user information between said base station and said mobile station;

adding means for adding the transmission power values output from said first to third calculation means in units of frequency bands in the IS-95 scheme to calculate a base station transmission power value; and occupied band control means for, when there is a frequency band in the IS-95 scheme in which a sum of a base station transmission power value of an adjacent W-CDMA base station apparatus which is notified from each of said adjacent WCDMA base station apparatuses and the base station transmission power value output from said adding means in units of frequency bands in the IS-95 scheme is not less than a predetermined threshold, performing a frequency handoff to switch a communication channel using the frequency band in which the sum is not less than the threshold to another frequency band.

* * * * *